US011999281B2

(12) United States Patent
Tuttle et al.

(10) Patent No.: US 11,999,281 B2
(45) Date of Patent: Jun. 4, 2024

(54) CUPHOLDER ASSEMBLY

(71) Applicant: Precise Flight, Inc., Bend, OR (US)

(72) Inventors: Tyler Sam Tuttle, Redmond, OR (US); Douglas Peter LaPlaca, Austin, TX (US)

(73) Assignee: Precise Flight, Inc., Bend, OR (US)

( * ) Notice: Subject to any disclaimer, the term of this patent is extended or adjusted under 35 U.S.C. 154(b) by 0 days.

(21) Appl. No.: 18/316,655

(22) Filed: May 12, 2023

(65) Prior Publication Data

US 2023/0264618 A1 Aug. 24, 2023

Related U.S. Application Data

(63) Continuation of application No. 18/052,074, filed on Nov. 2, 2022, which is a continuation-in-part of application No. 17/314,725, filed on May 7, 2021.

(60) Provisional application No. 63/021,308, filed on May 7, 2020.

(51) Int. Cl.
*A47G 29/093* (2006.01)
*B60N 3/10* (2006.01)
*B65D 41/06* (2006.01)

(52) U.S. Cl.
CPC .......... *B60N 3/102* (2013.01); *A47G 29/093* (2013.01); *B65D 41/06* (2013.01); *Y10S 224/926* (2013.01); *Y10T 403/7007* (2015.01)

(58) Field of Classification Search
CPC .... A47G 23/0216; B60N 3/103; B60N 3/102; B64D 11/00; B64D 11/0638; A61J 1/16; Y10T 24/44598; Y10T 403/7007; A61G 2203/78; Y10S 224/926
USPC ....... 220/779, 737, 729, 293, 298, 630, 636, 220/300; 248/309.1, 310, 222.52, 364.04; 215/386, 222; 403/348, 349
See application file for complete search history.

(56) References Cited

U.S. PATENT DOCUMENTS

| | | | | |
|---|---|---|---|---|
| 3,233,858 | A | | 2/1966 | Benjamin |
| 4,040,549 | A | | 8/1977 | Sadler |
| 4,127,211 | A | | 11/1978 | Zerbey |
| 4,919,381 | A | | 4/1990 | Buist |
| 5,040,719 | A | | 8/1991 | Ballway |
| 5,294,018 | A | | 3/1994 | Boucher |
| 5,529,201 | A | * | 6/1996 | Tallent ............... B60K 15/0406 220/302 |
| 5,722,574 | A | * | 3/1998 | Pratt ......................... A45F 5/00 224/660 |
| 5,765,715 | A | | 6/1998 | Hughes |
| 6,145,715 | A | | 11/2000 | Slonim |

(Continued)

FOREIGN PATENT DOCUMENTS

| | | | | |
|---|---|---|---|---|
| CN | 105996687 | A | * | 10/2016 |
| CN | 105996687 | A | | 10/2016 |
| CN | 211710692 | U | | 10/2020 |

OTHER PUBLICATIONS

United States Patent and Trademark Office, Office Action, U.S. Appl. No. 17/314,725 dated Jun. 23, 2022, 12 pages.

(Continued)

*Primary Examiner* — Don M Anderson
*Assistant Examiner* — John Martin Hoppmann
(74) *Attorney, Agent, or Firm* — Chernoff, Vilhauer, McClung & Stenzel, LLP

(57) ABSTRACT

A selectively engageable and interlocking cupholder assembly, which may be used an aircraft or vehicle interior while in movement.

5 Claims, 19 Drawing Sheets

(56) References Cited

U.S. PATENT DOCUMENTS

| | | | | |
|---|---|---|---|---|
| 6,439,418 | B1 | 8/2002 | Immerman et al. | |
| 6,511,031 | B2 * | 1/2003 | Lin | A47G 19/2261 248/205.5 |
| 6,520,368 | B1 * | 2/2003 | Chiu | A47J 41/00 220/630 |
| 7,770,748 | B2 | 8/2010 | Elliott | |
| 8,191,844 | B2 * | 6/2012 | Pennino | B62J 11/04 248/220.21 |
| 8,757,418 | B2 * | 6/2014 | Zimmerman | A47G 29/093 248/205.8 |
| 9,241,554 | B1 | 1/2016 | Tong | |
| 10,596,946 | B1 * | 3/2020 | Huntley | B60N 3/103 |
| 11,345,424 | B2 | 5/2022 | Weiss et al. | |
| 2002/0130133 | A1 | 9/2002 | Immerman et al. | |
| 2006/0249520 | A1 | 11/2006 | DeMonte | |
| 2014/0117031 | A1 | 5/2014 | Zimmerman et al. | |
| 2015/0096115 | A1 | 4/2015 | Shebek et al. | |
| 2017/0341694 | A1 | 11/2017 | Vogt et al. | |

OTHER PUBLICATIONS

United States Patent and Trademark Office, Final Office Action, U.S. Appl. No. 17/314,725 dated Jan. 18, 2023 13 pages.

U.S. Receiving Office, International Search Report and Written Opinion for PCT Application No. PCT/US23/78515, dated Feb. 6, 2024, 9 pages.

* cited by examiner 200
220
217
125B
216
217
104
110
100
105
118
117
117
116
111

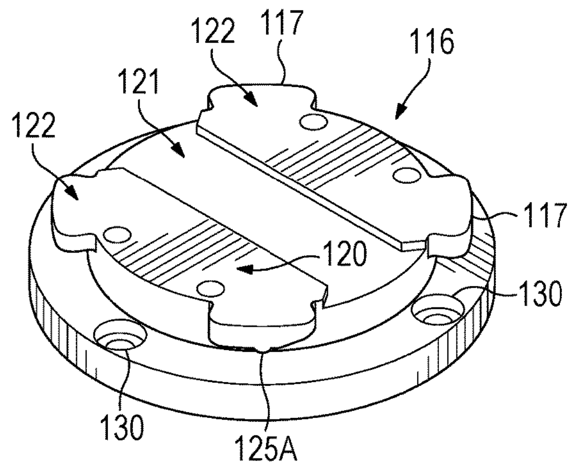
AMENDED FIG. 14
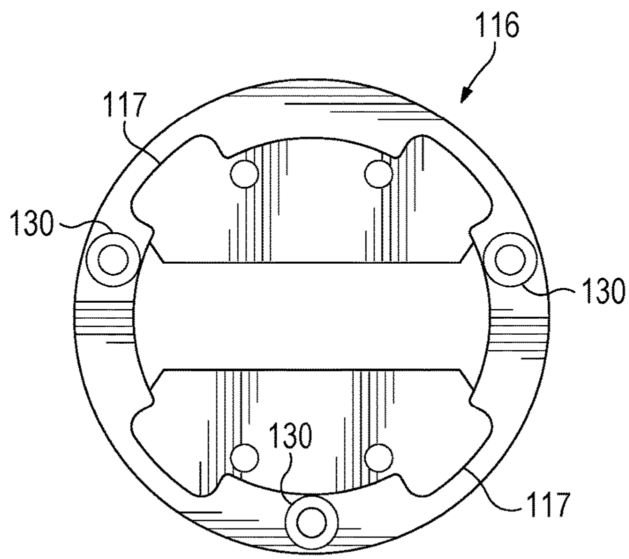
FIG. 15
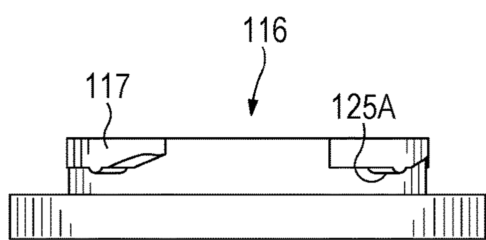
FIG. 16
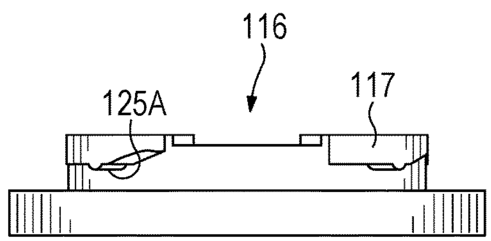
FIG. 17

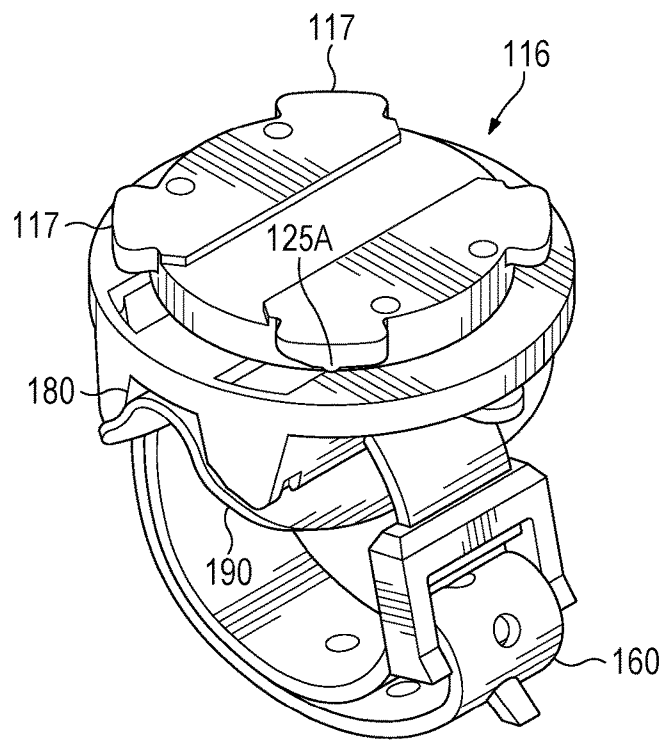
FIG. 27
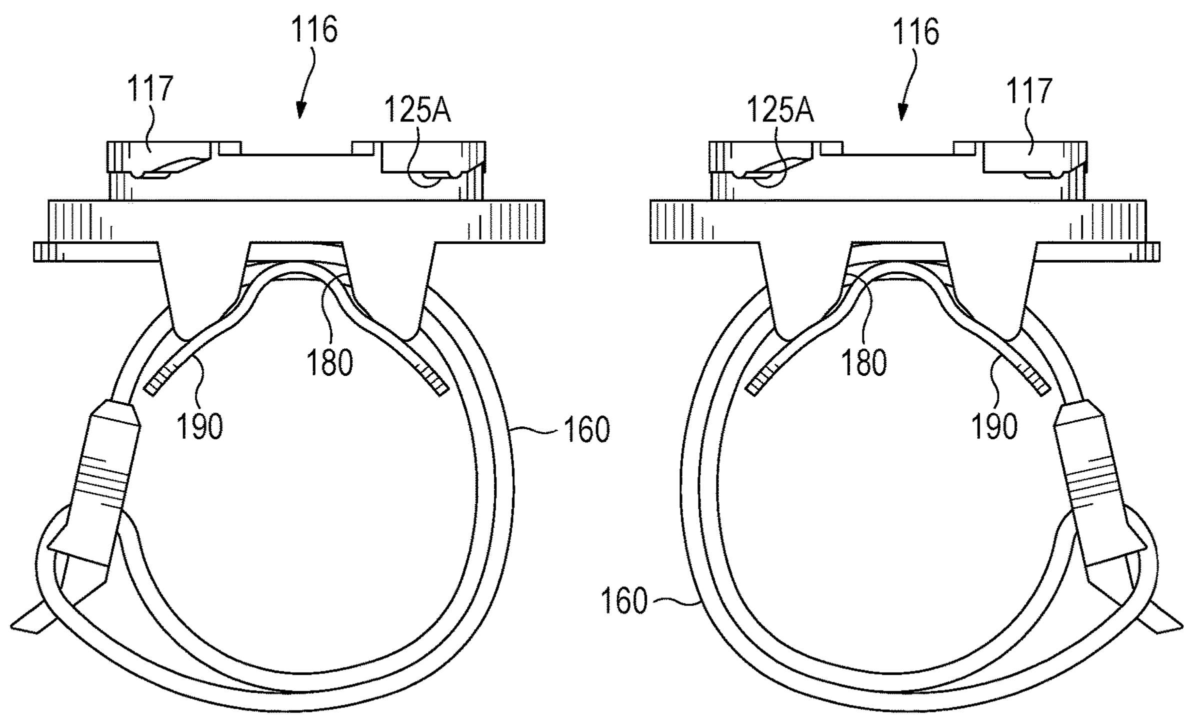
FIG. 28
FIG. 29

CUPHOLDER ASSEMBLY

CROSS REFERENCE TO RELATED APPLICATIONS

This application is continuation of U.S. Non-Provisional application Ser. No. 18/052,074, filed Nov. 2, 2022, which is a continuation in part of U.S. Non-Provisional application Ser. No. 17/314,725, filed May 7, 2021, which claims the benefit of U.S. Provisional Application No. 63/021,308 filed on May 7, 2020, the entire disclosure of which is hereby incorporated herein by reference for all purposes.

BACKGROUND OF THE INVENTION

None.

SUMMARY OF THE INVENTION

The present disclosure is directed to a selectively engageable cupholder assembly, which may be used in an aircraft or vehicle interior while in movement.

In the aviation industry, passengers and pilots may opt to drink beverages and liquids while in flight. Oftentimes, turbulence may occur, resulting in drink spillage. Loose drinkware in the cockpits of airplanes, helicopters, and other vehicles causes spillage, leading to accidents and impeding operation of the aircraft/vehicle. It is especially dangerous when the drinkware slips behind the pedals of the aircraft resulting in accidents and impeded operation of the aircraft/vehicle.

Additionally, spilled beverages in cockpits and other vehicles cause millions of dollars of damage to aircraft. Spills may be hard to remove and cause great inconvenience to flight personnel, especially if the spillage occurs in the cockpit. Finally, given the increase in aircraft sales and travel, there exists a need for solutions for the modern aircraft cabin.

What is desired, therefore, is a cupholder system or assembly that will be suitable in preventing beverage-related accidents in aircraft, or any type of moving vehicle.

BRIEF DESCRIPTION OF THE DRAWINGS

For a better understanding of the disclosure, and to show how the same may be carried into effect, reference will now be made, by way of example to the accompanying drawings, which:

FIG. 14 is perspective view of the base of the embodiment of FIG. 9;

FIG. 15 is a top view of the base of the embodiment of FIG. 9;

FIG. 16 is a side view of the base of the embodiment of FIG. 9;

FIG. 17 is an alternate side view of the base of the embodiment of FIG. 9;

FIG. 27 is a perspective view of a base of the FIG. 26 embodiment;

FIG. 28 is a side view of the base of the FIG. 26 embodiment;

FIG. 29 is an alternate side view of the base of the FIG. 26 embodiment;

DETAILED DESCRIPTION OF PREFERRED EMBODIMENTS

Figure 1:
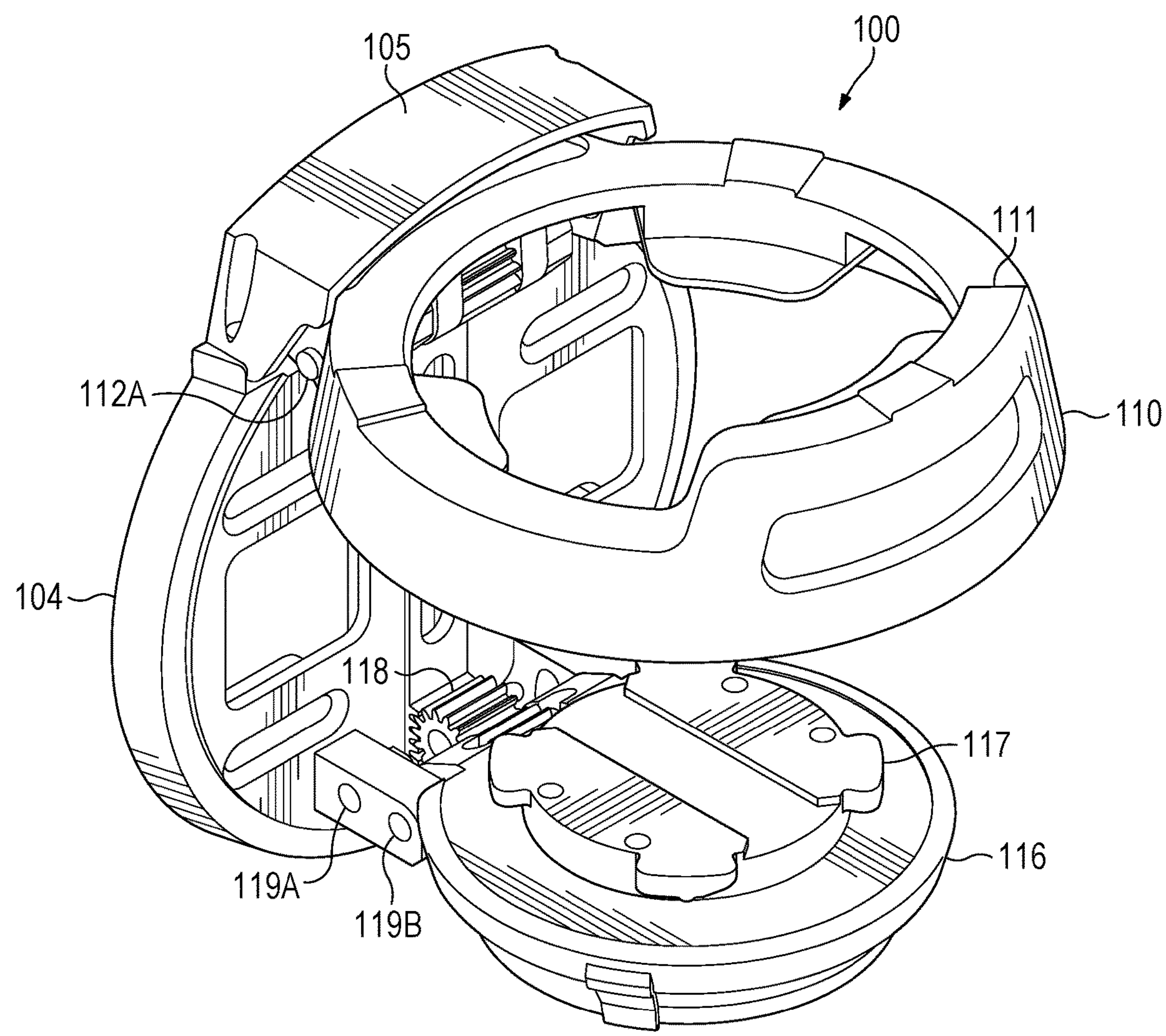
FIG. 1 shows a perspective view of a first exemplary embodiment of the present disclosure.
Figure 2:
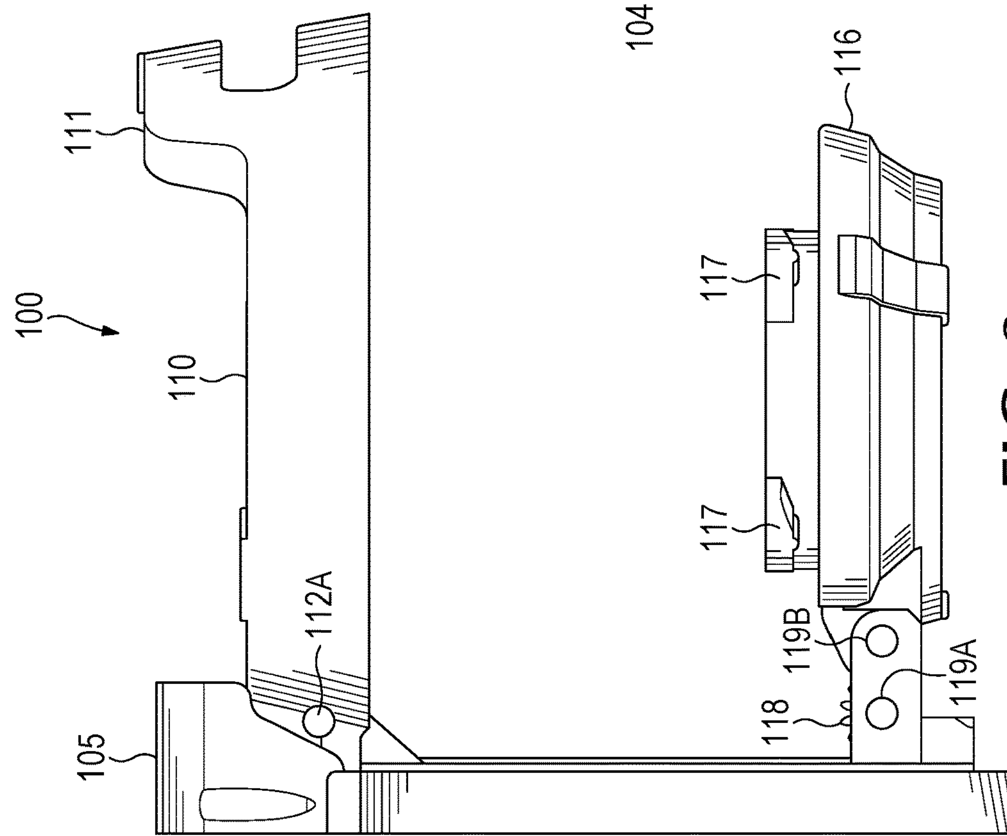
FIG. 2 shows a side view of the assembly of FIG. 1.

Referring to FIGS. 1-6, an illustrative example of a cupholder assembly 100 is shown, which can be used to hold beverages and bottled liquids in an aircraft. In some embodiments, the assembly 100 includes a generally circular top member 110, a generally circular bottom member 116, and a generally circular main member 104. As shown in FIG. 1, both the top 110 and bottom members 116 may be pivotably attached to the main member 104, so that the top and bottom members may be generally perpendicular to the main member when in use to hold beverages or liquid containers. As shown in FIG. 2, in a preferred embodiment, the top and bottom members may be attached to the main member with a rack and pinion 118 mechanism, and/or threaded members, pins (112A, 112B, 119A, 119B), or other equivalent components.

Figure 3:
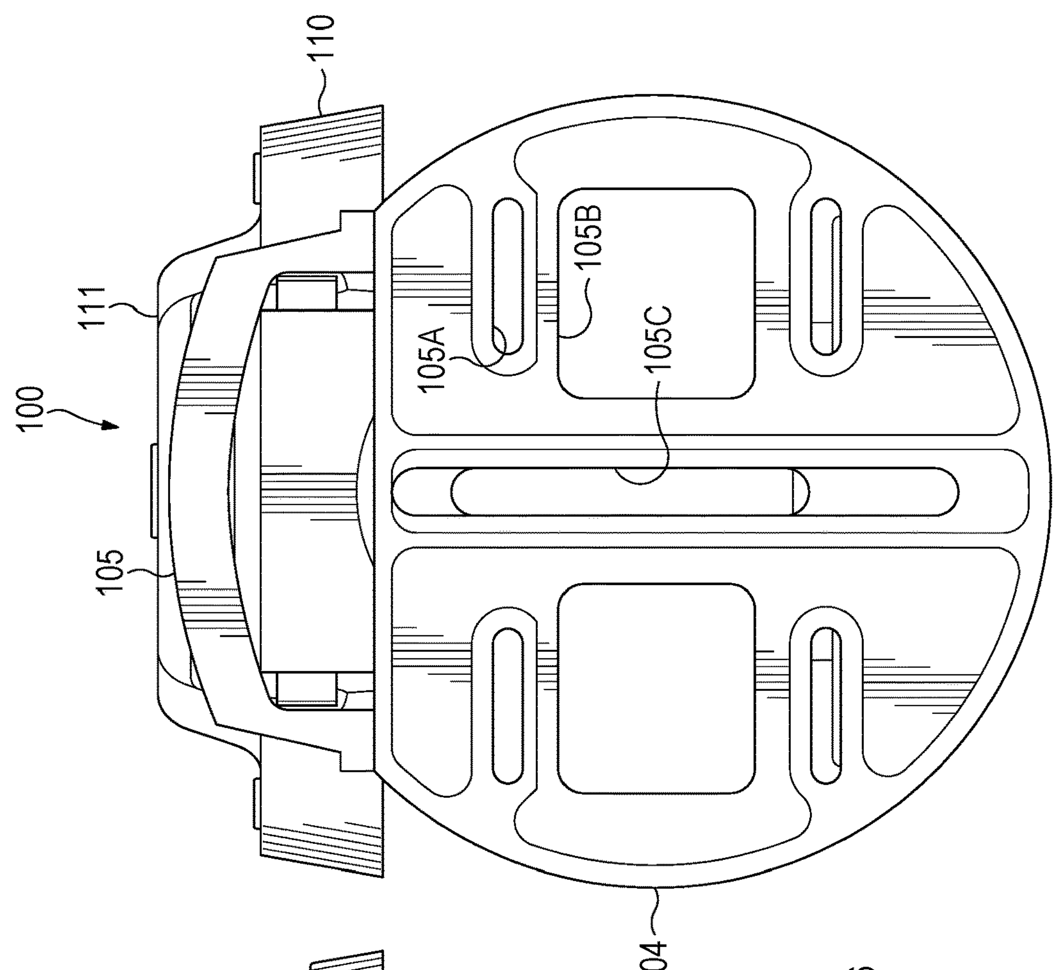
FIG. 3 shows a rear view of the assembly of FIG. 1.

As shown in FIGS. 2 and 3, the generally circular main member 104 may have an upward extended portion 105 at the top of the member. As shown in FIG. 2, the top member

110 may have a ridge 111 extending generally in an upward direction, when the top member is generally perpendicular in placement to the main member 104. As shown in FIG. 3, the main member 104 may have locking recesses 105A, 105B, 105C made along the surface to allow threaded members and other materials to pass through when the assembly 100 is being installed to the aircraft or vehicle. The members may be made from high quality and durable but lightweight materials, such as metal, in particular, aluminum. The members should also be hardy enough to hold when construction components like threaded members are engaged with the members and passing through.

Referring to FIGS. 2 and 4 to 6, the assembly 100 may be selectively engaged so that the top 110 and bottom member 116 may pivotably fold into the main member 104. In the preferred embodiment, the members may engage through a rack and pinion 118 mechanical design, accompanied with corresponding pins 112A, 112B, 119A, 119B, threaded members or other equivalents to aid in attachment of the members. In doing so, the top 110 and bottom member 116 may have dimensions corresponding to the main member so that when the top and bottom members are fully engaged or folded into the main member, the two may fold neatly over each other in a face-to-face abutment.

Figure 4:
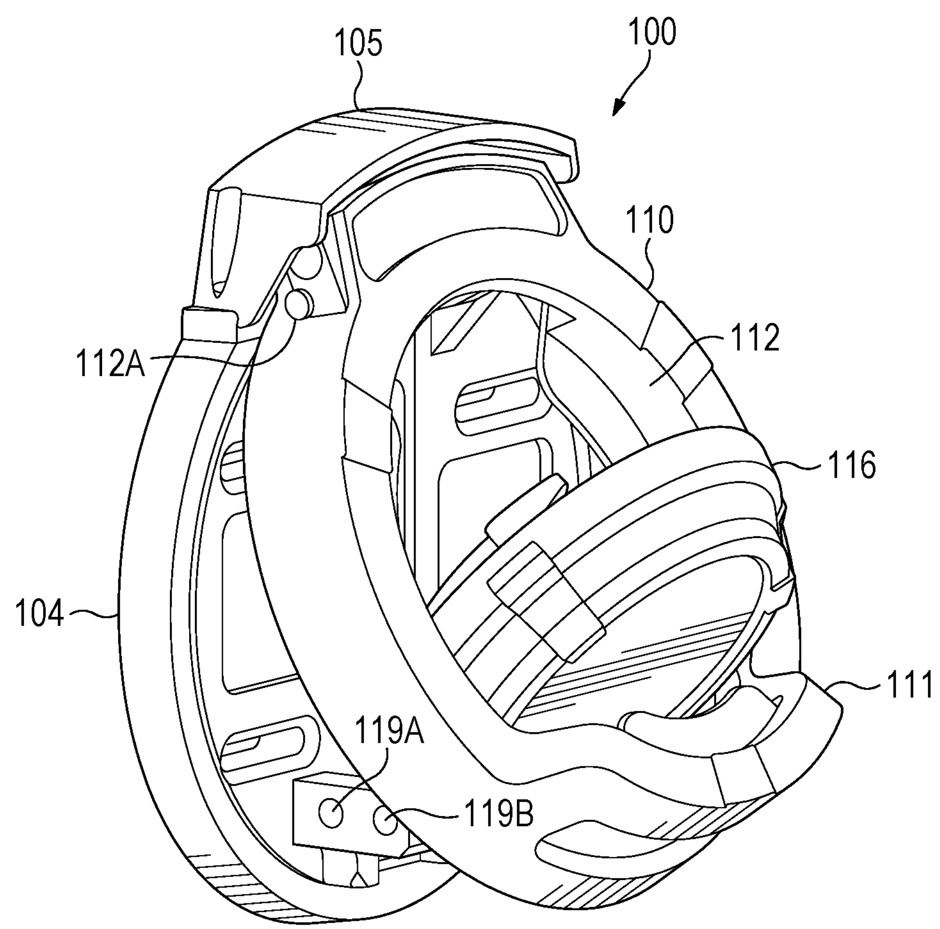
FIG. 4 shows a perspective view of the assembly of FIG. 1 when partially engaged.
Figure 5:
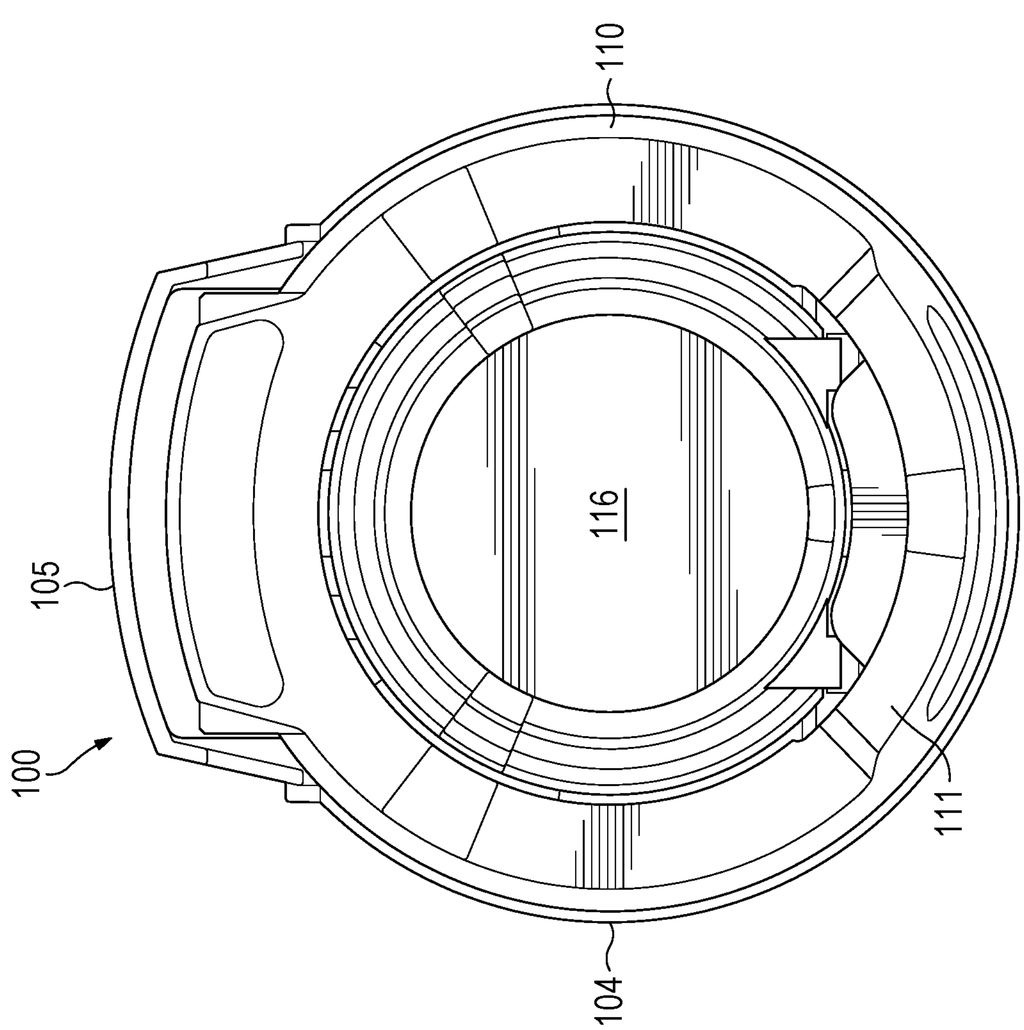
FIG. 5 shows a perspective view of the assembly of FIG. 1 when fully engaged.

As shown in FIGS. 4 and 5, the top member 110 may have a circular opening 112 that generally conforms to the dimensions of the bottom member 116. When the assembly 100 is selectively engaged, the opening 112 may allow for the entirety of the bottom member 116, excluding the portion pivotably attached to the main member, to pass or slide through the top member 110, until the top member 110 is in ultimate face-to-face abutment with the bottom member 116. Because aircraft cupholder breakage is often caused by the user stepping on the cupholder by accident, allowing the three members to pivotably engage and fold into a unitary mass allows for increased structural strength and further prevents the members from breaking upon unwanted impact.

Figure 6:
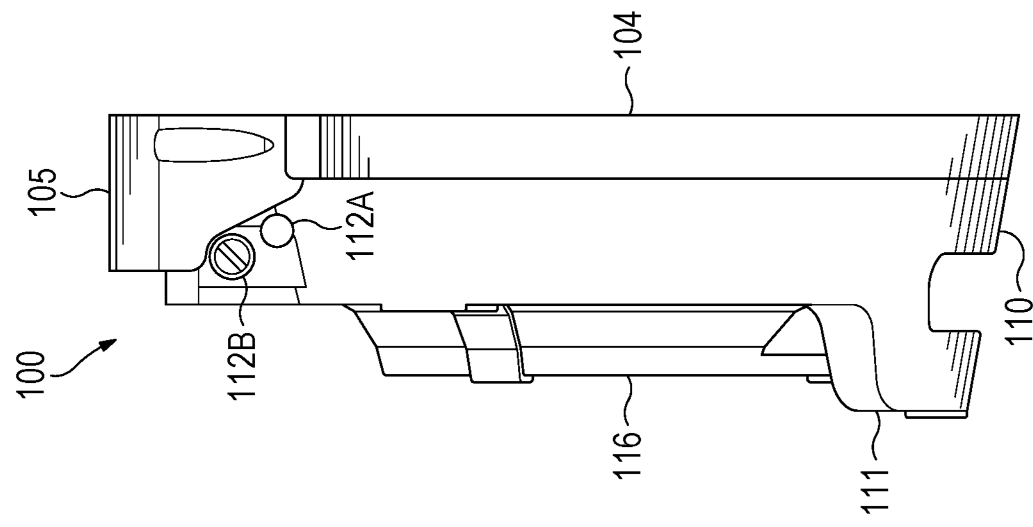
FIG. 6 a side view of the assembly of FIG. 1 when fully engaged.

As shown in FIGS. 1 and 6, when the top member 110 is fully engaged and folded into a face-to-face abutment with the other members, the top member 110 may have an extended ridge 111 that adheres generally to the dimensions of the bottom member 116 and envelops the bottom member 116. Doing so aids in the support and stability of the bottom member 116. As shown in FIGS. 2 and 6, when the top member is fully engaged with the main member 104, the main member 104 may have an upward extended portion 105 that adheres generally to the dimensions of the top member 110 and envelops the top member 110. Having these features aid in the support and stability of the bottom 116 and top member 110. Further, as shown in FIG. 3, because the dimensions of the extended portion 105 are slightly larger and envelope the connection points where the top member is connected to the main member, the extended portion 105 may protect the rack and pinion system and its corresponding pins attaching the top and main member from external impact.

The assembly 100 may be easily integrated into an aircraft's existing beverage console design, allowing for minimal design work and maximum safety of beverages and drinkware. Throughout the application, drinkware, beverage container, and water bottle are used interchangeably. The assembly may also be available as an interior mounted module, so that it may be installed on the interior wall of the aircraft cabin. This option would allow for easy access to beverages by the user, while offering little obtrusion into aircraft cabin space while the assembly is fully engaged.

Figure 7:
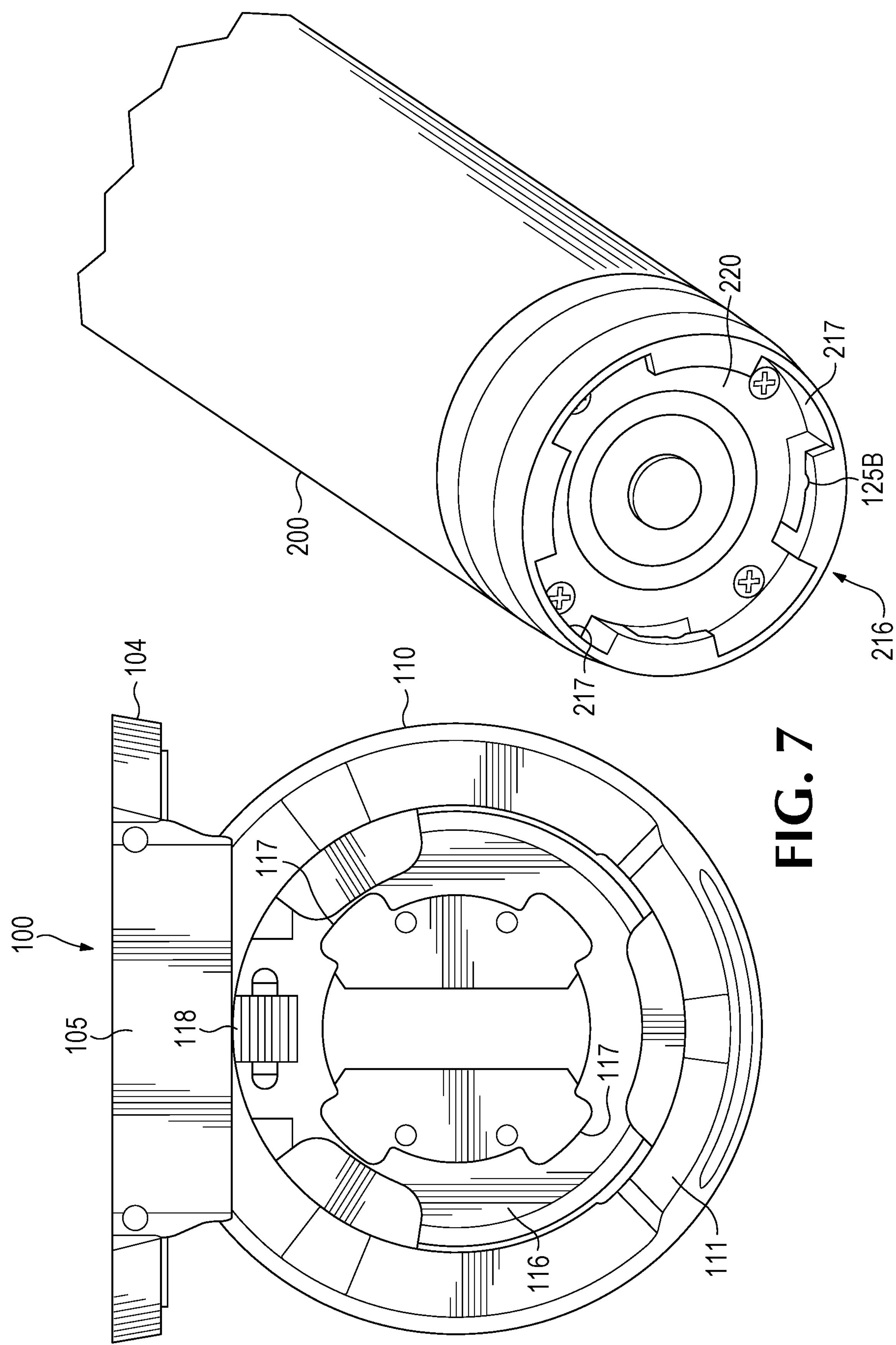
FIG. 7 shows a second embodiment of the cupholder assembly.
Figure 8:
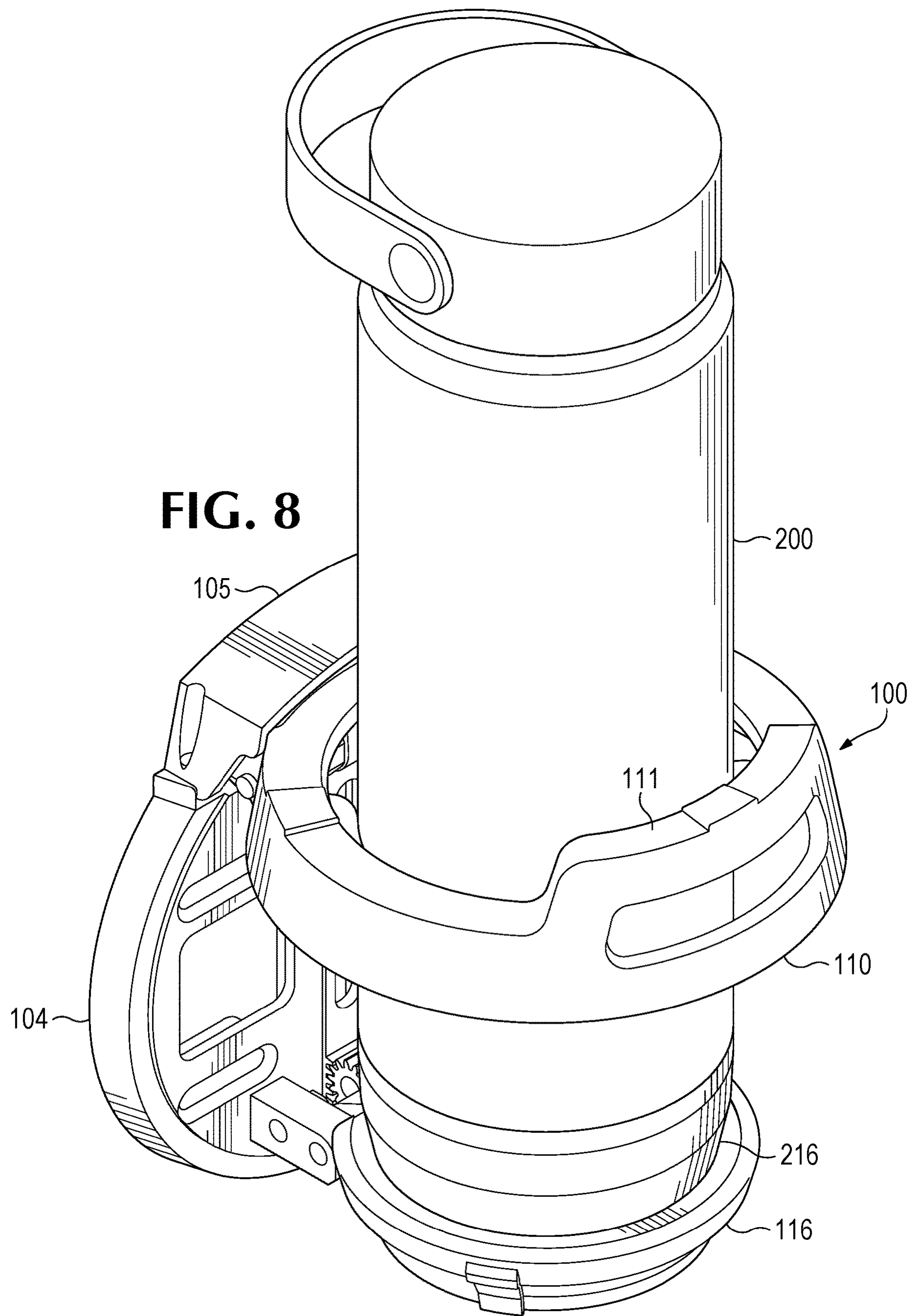
FIG. 8 shows perspective view of the cupholder assembly of FIG. 7.
Figure 9:
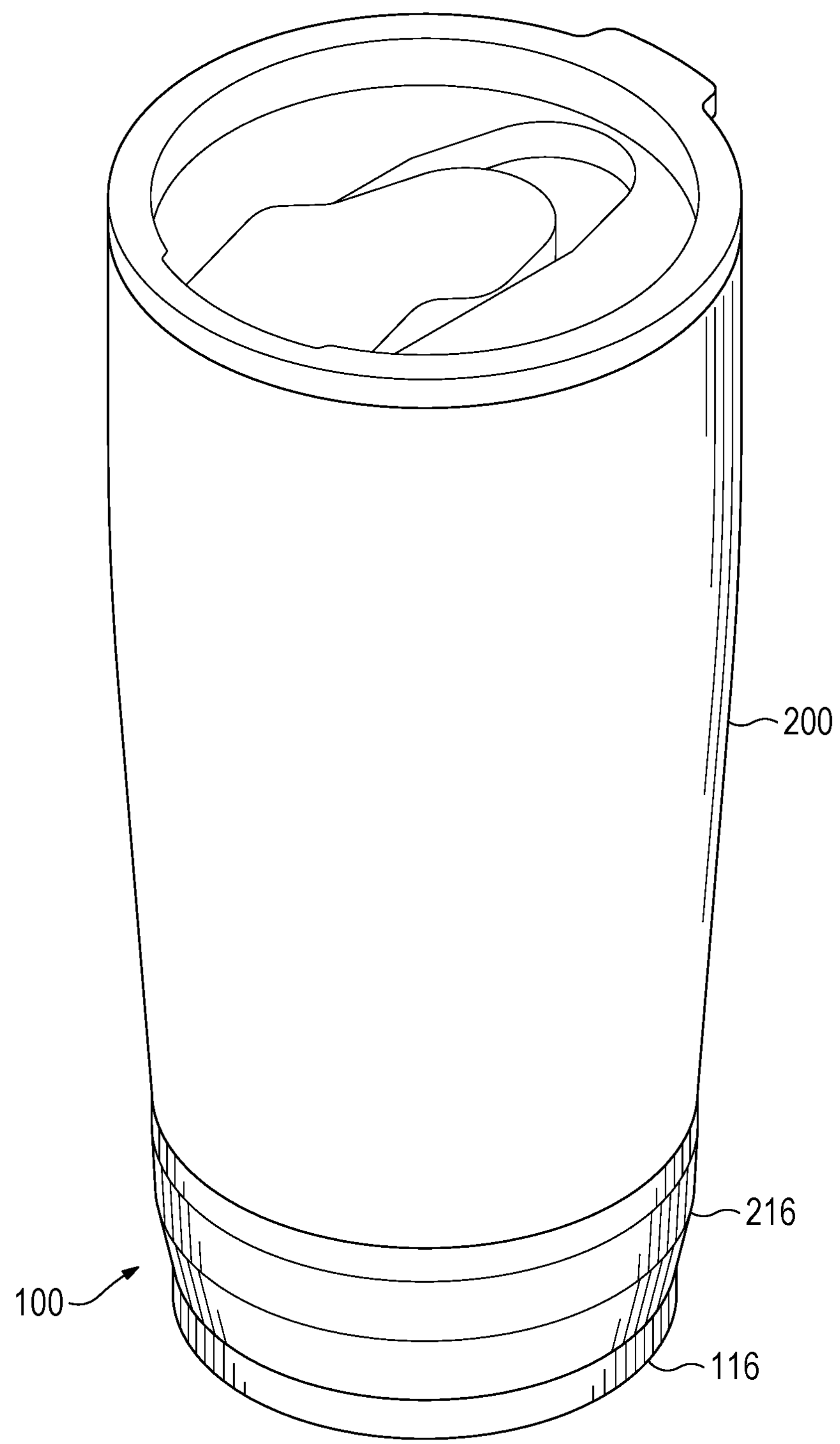
FIG. 9 is a perspective view of a third embodiment.
Figure 10:
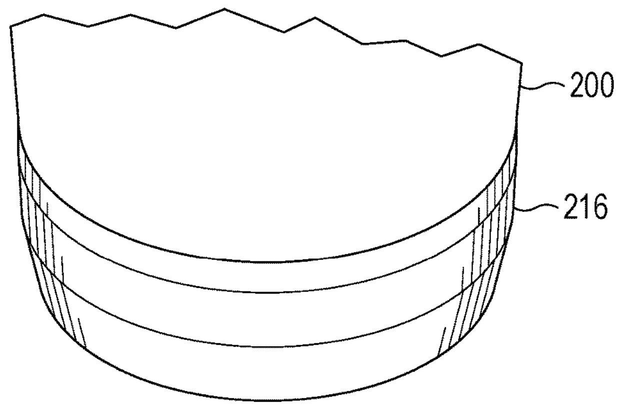
FIG. 10 is a perspective view of a cup of embodiment of FIG. 9.
Figure 12:
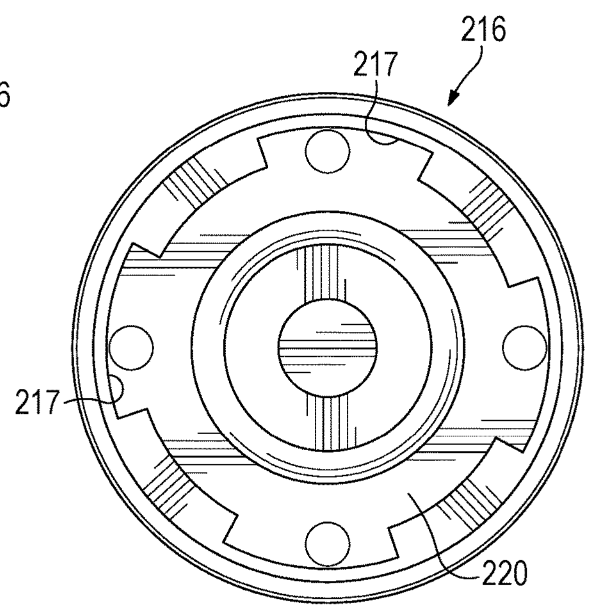
FIG. 12 is a bottom view of the cup of the embodiment of FIG. 9.
Figure 11:
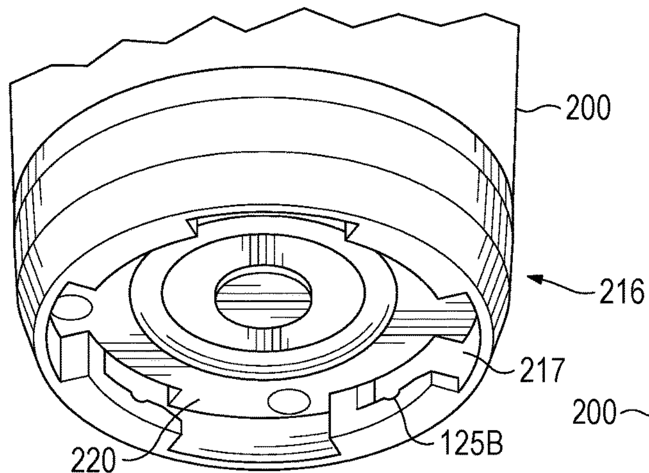
FIG. 11 is a bottom perspective view of the cup of FIG. 9.
Figure 13:
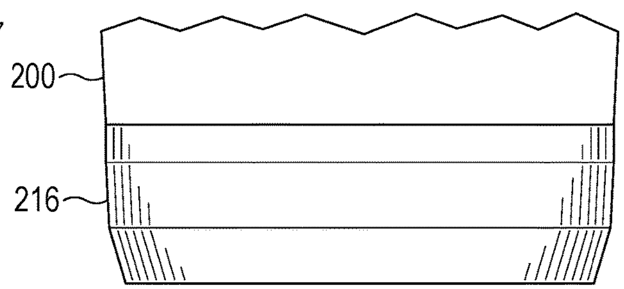
FIG. 13 is a side view of the cup of the embodiment of FIG. 9.
Figure 18:
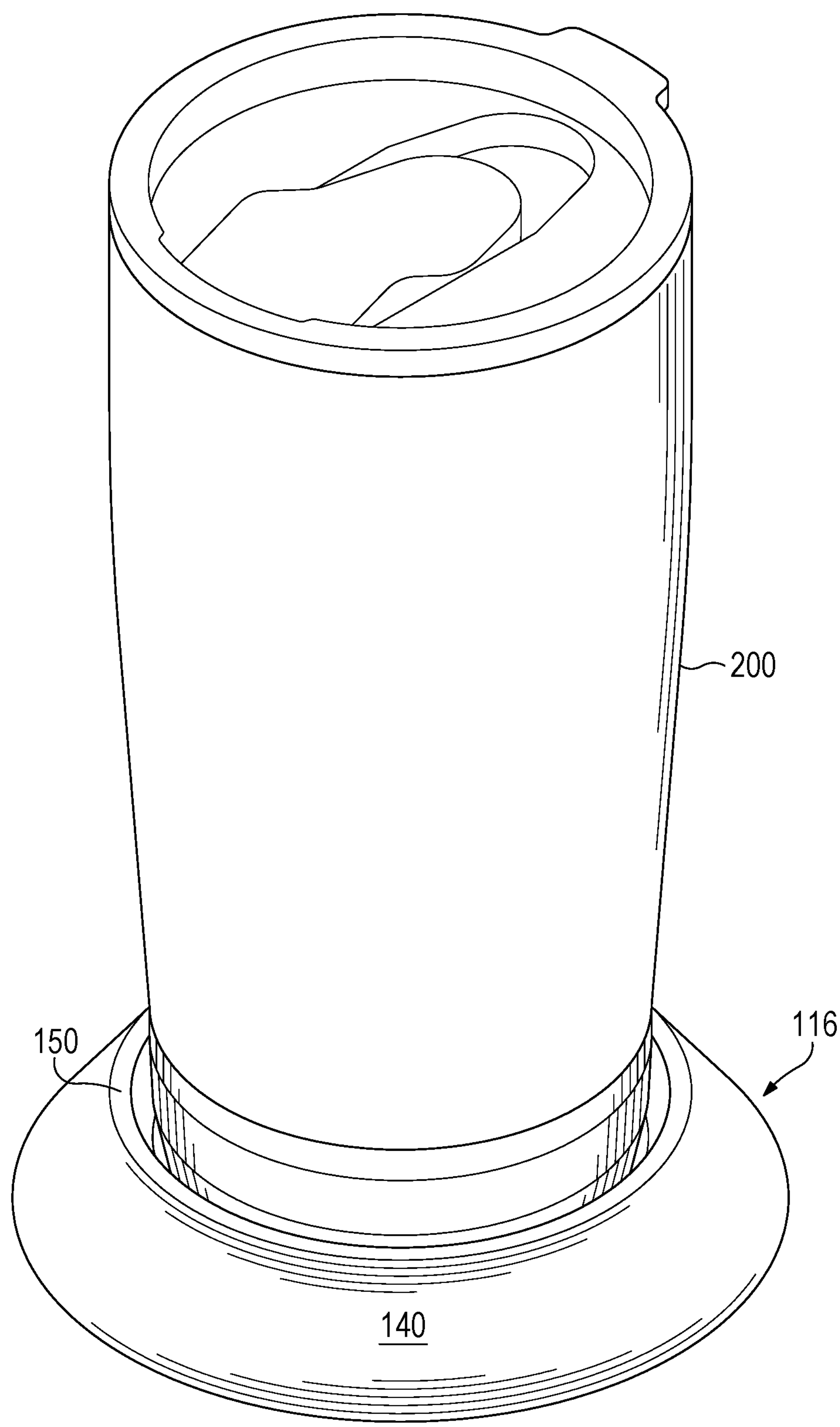
FIG. 18 is a perspective view of a fourth embodiment.
Figure 19:
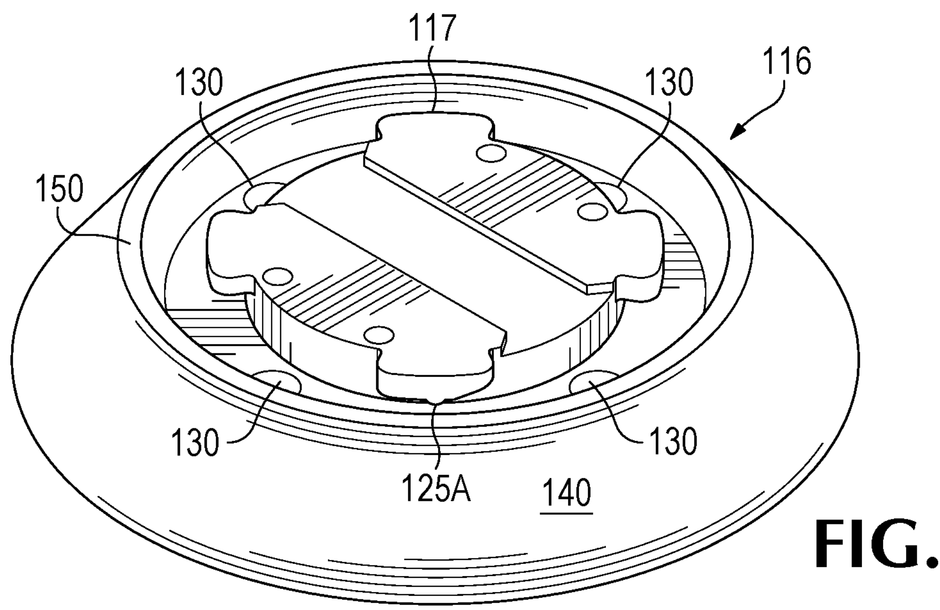
FIG. 19 is a perspective view of a base of the embodiment of FIG. 18.
Figure 20:
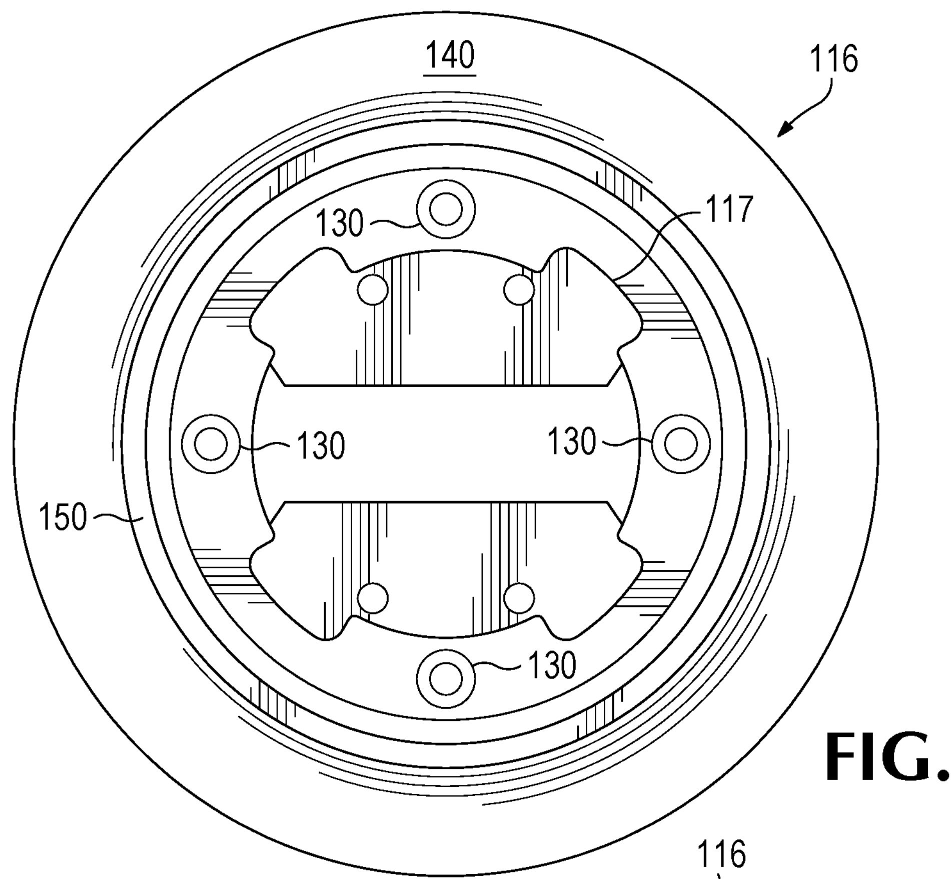
FIG. 20 is a top view of the base of the embodiment of FIG. 18.
Figure 21:
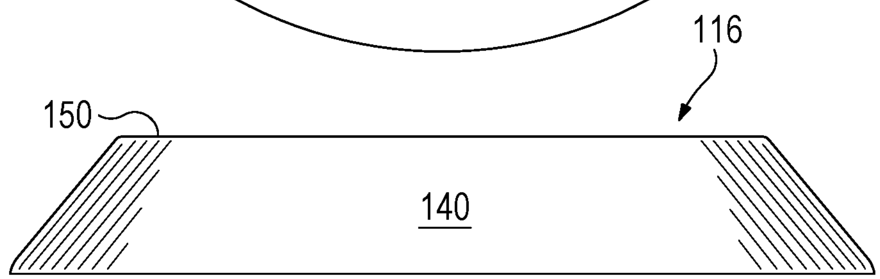
FIG. 21 is a side view of the base of the embodiment of FIG. 18.
Figure 22:
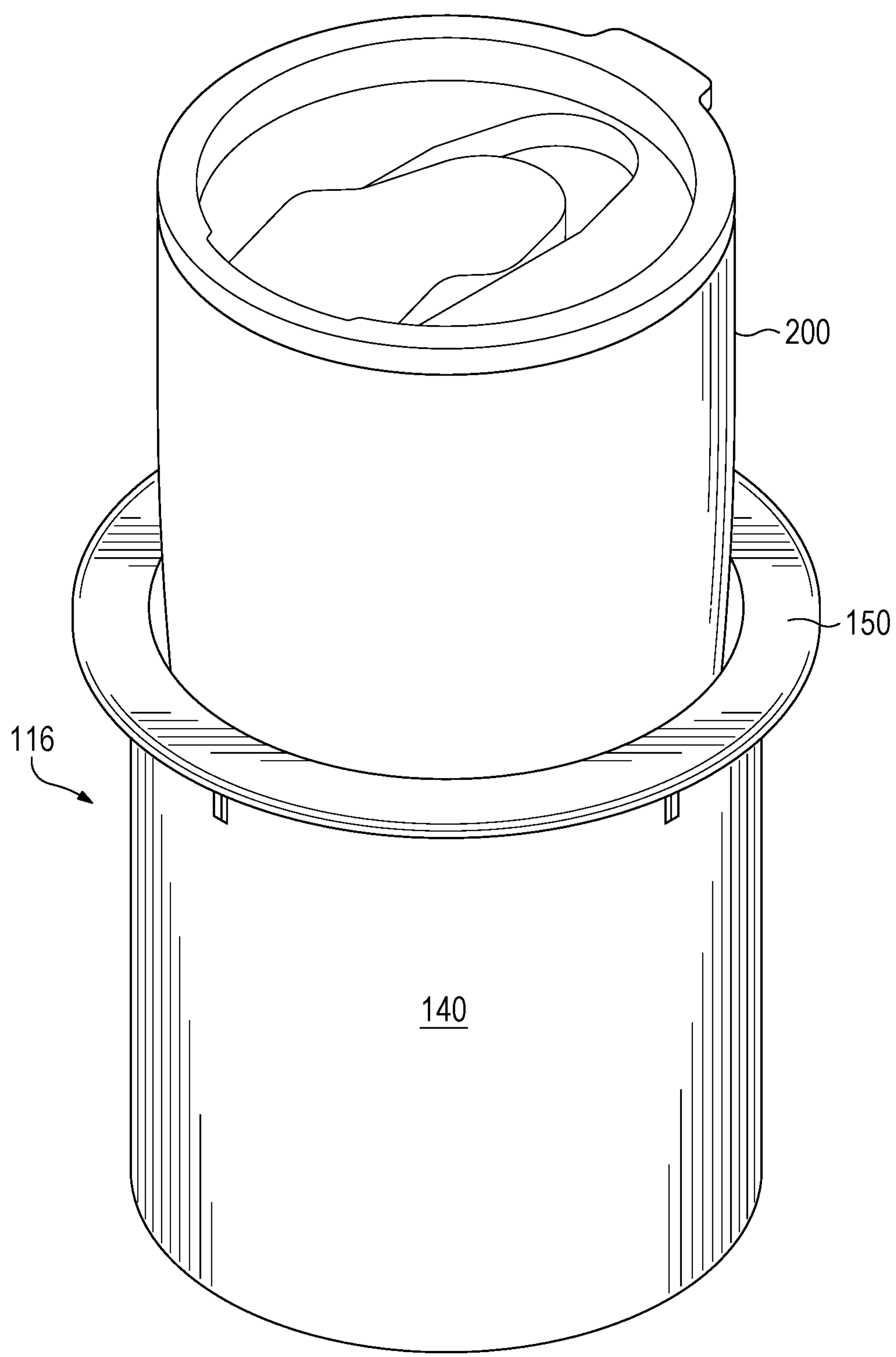
FIG. 22 is a perspective view of a fifth embodiment.
Figure 23:
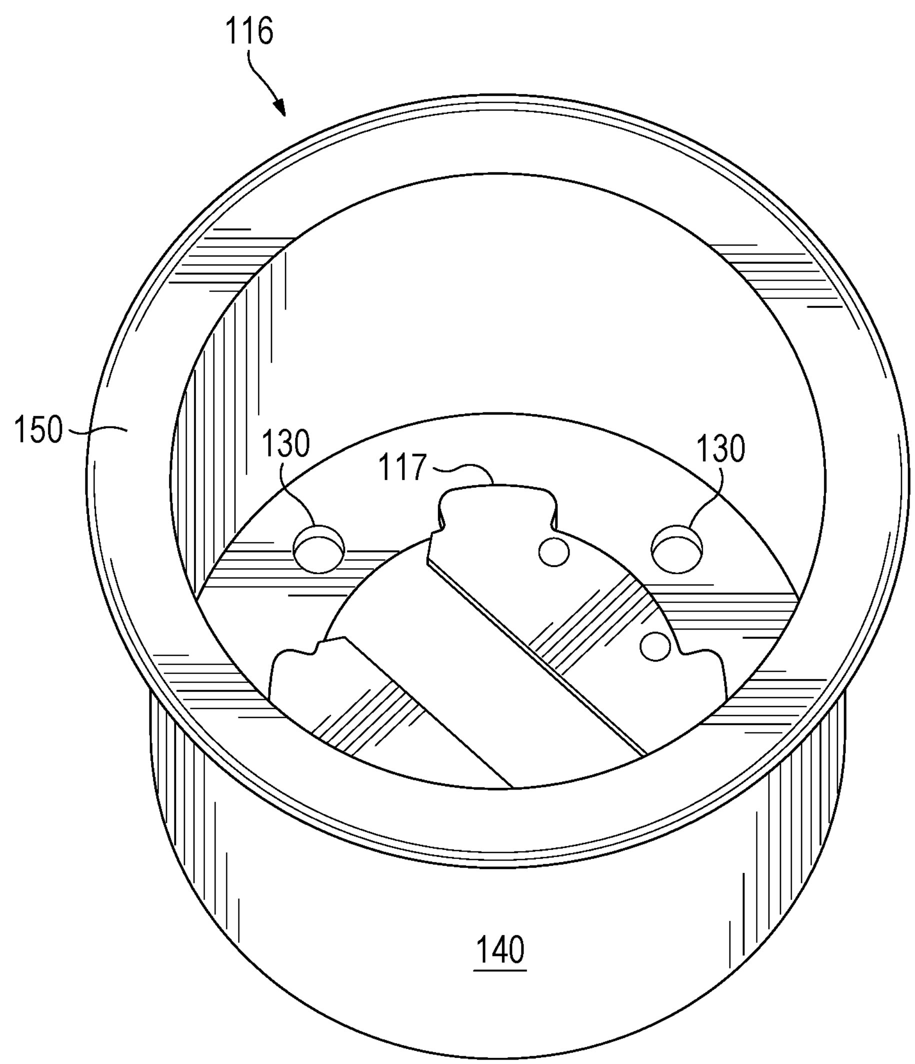
FIG. 23 is a perspective view of a base of the FIG. 22 embodiment.
Figure 24:
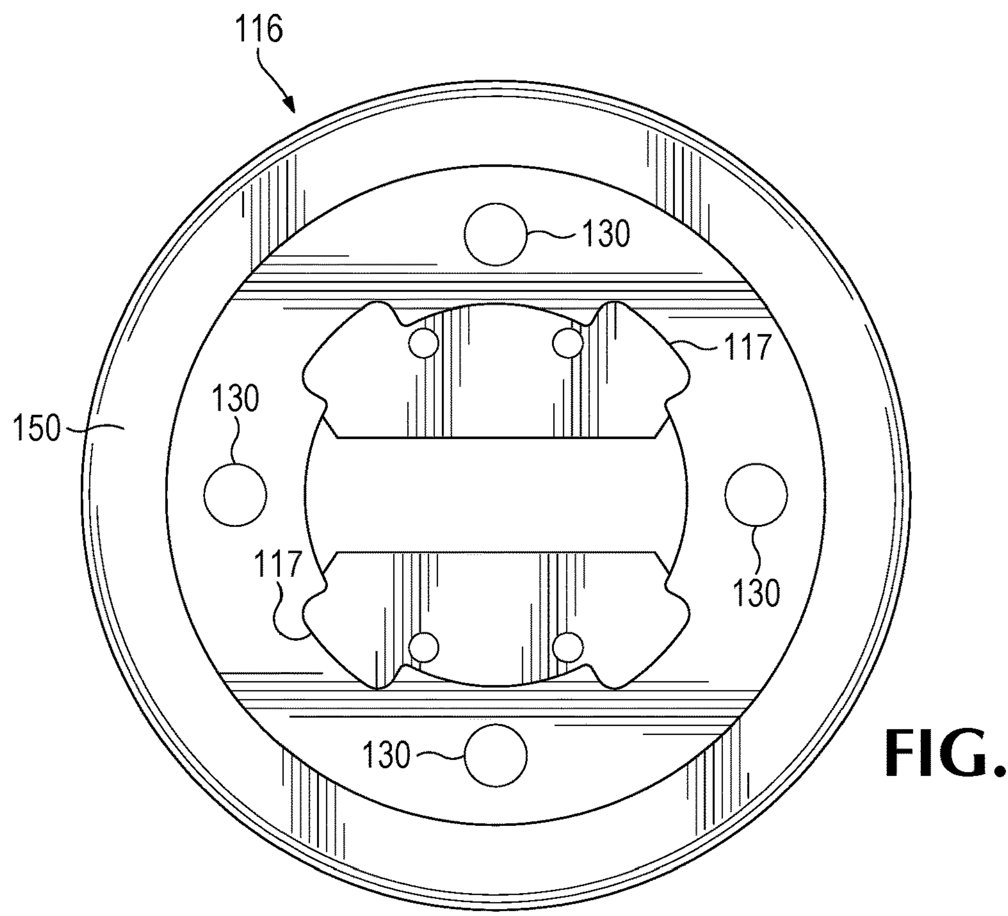
FIG. 24 is top view of the base of the FIG. 22 embodiment.
Figure 25:
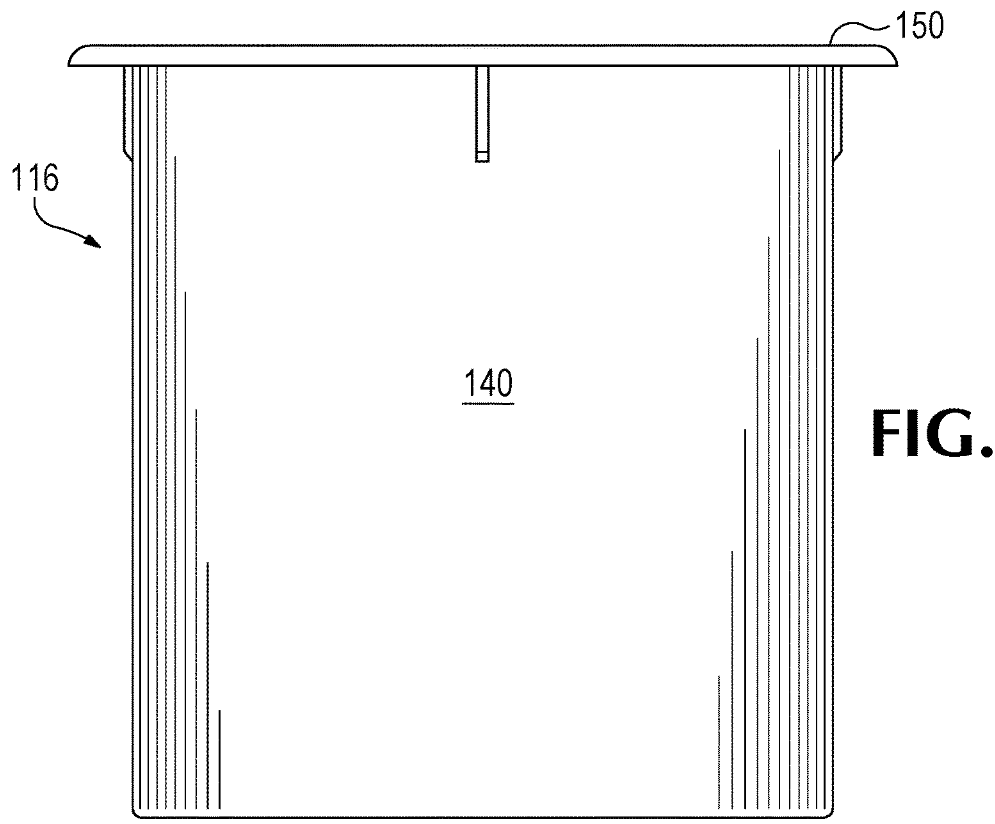
FIG. 25 is a side view of the base of the embodiment of FIG. 22.
Figure 26:
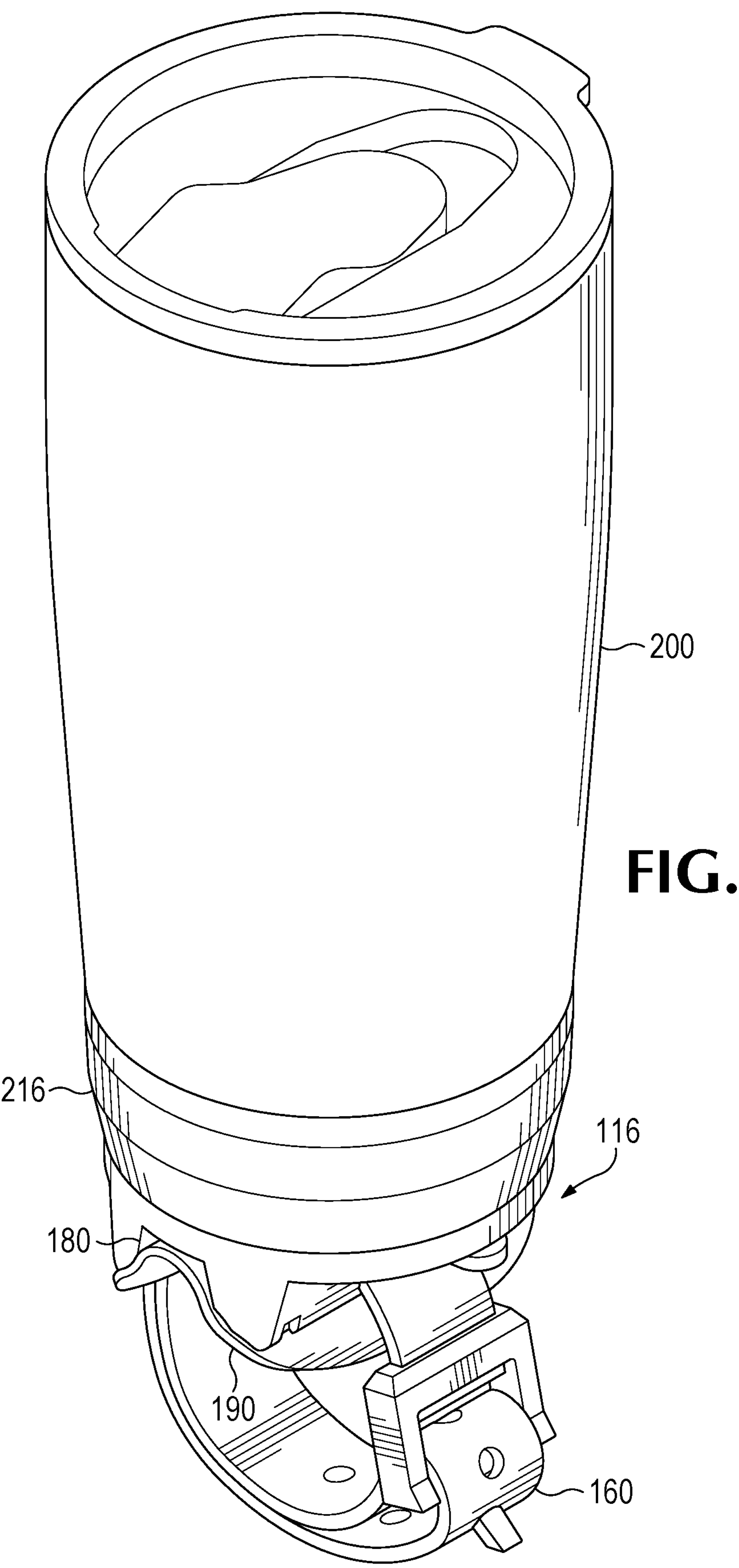
FIG. 26 is a perspective view of a sixth embodiment.
Figure 30:
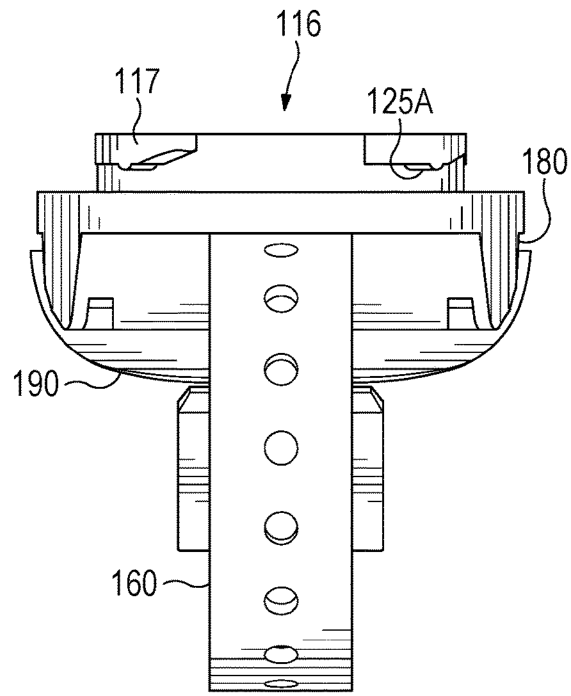
FIG. 30 is a front view of the base of the FIG. 26 embodiment.
Figure 31:
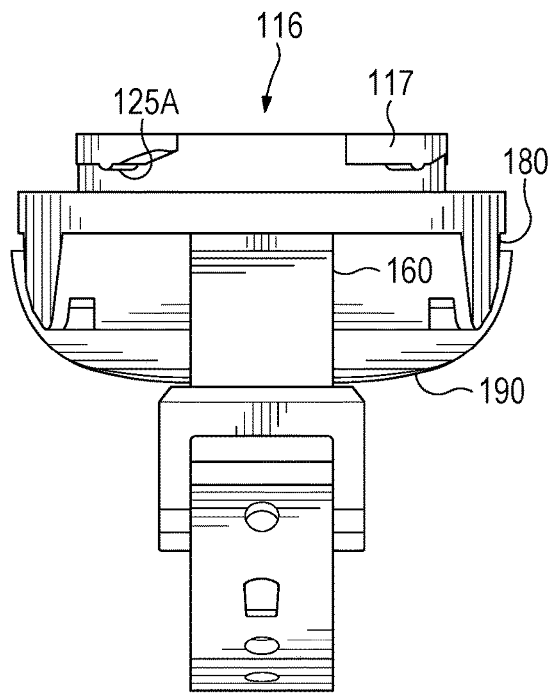
FIG. 31 is a rear view of the base of the FIG. 26 embodiment.
Figure 32:
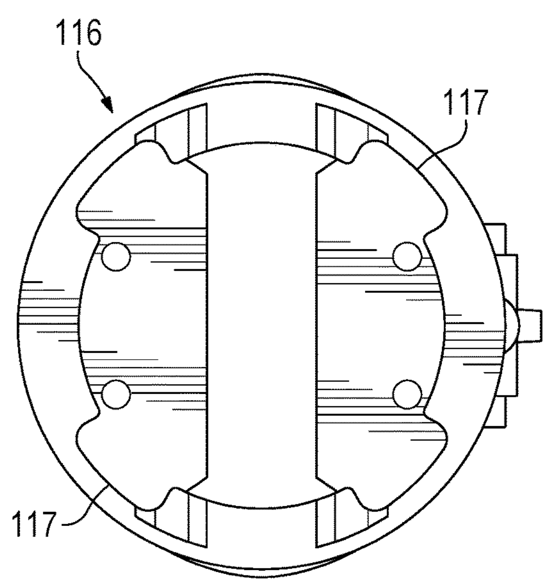
FIG. 32 is a top view of the base of the FIG. 26 embodiment.
Figure 33:
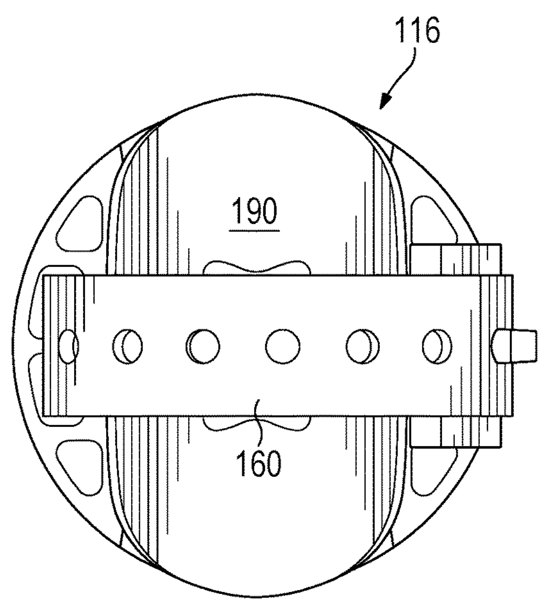
FIG. 33 is a bottom view of the base of the FIG. 26 embodiment.
Figure 34:
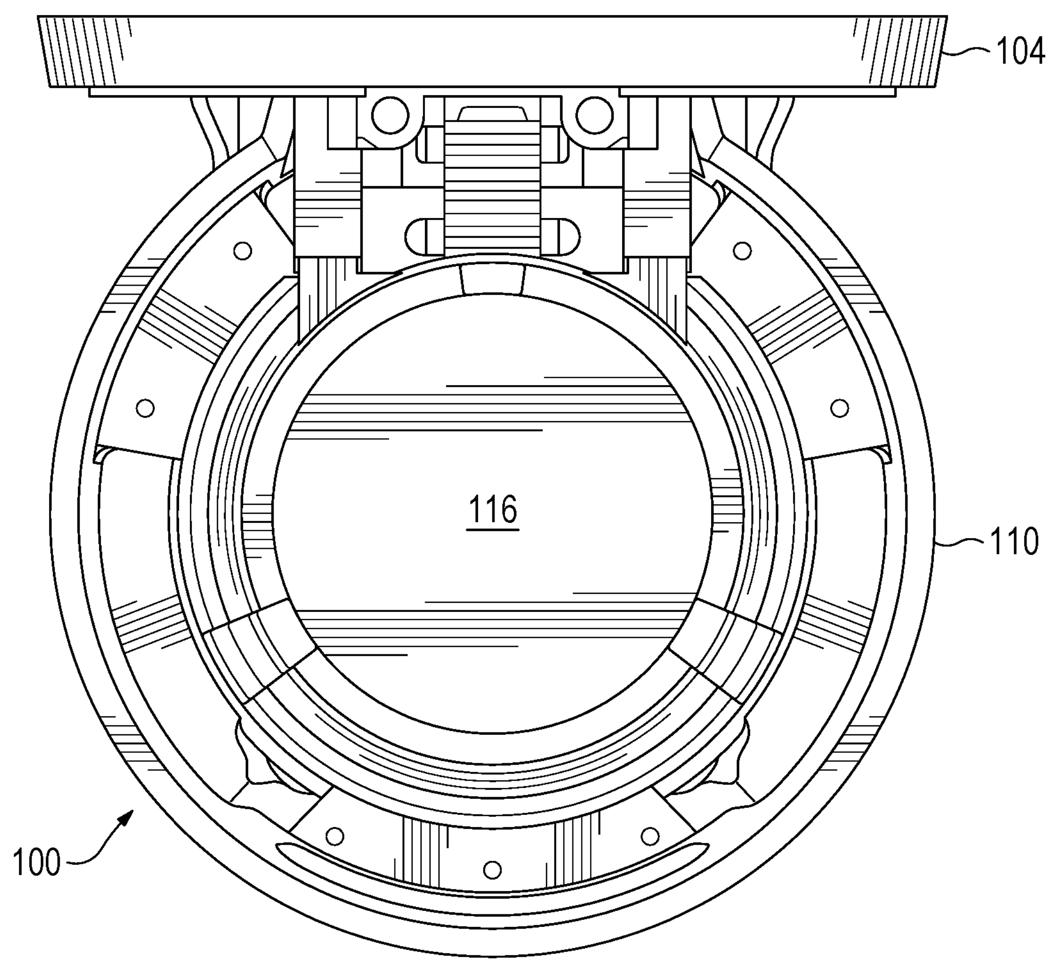
FIG. 34 is a bottom view of the base of the FIG. 5 embodiment.
Figure 35:
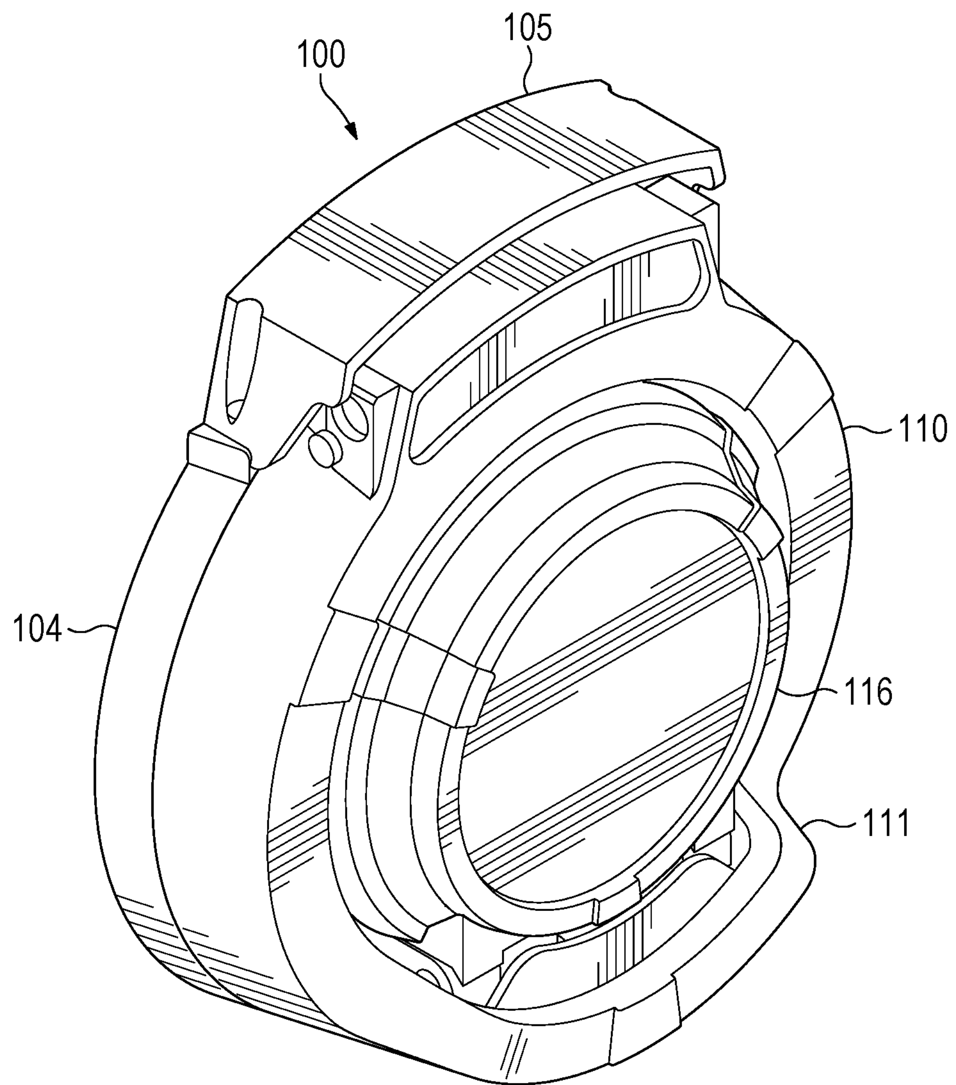
FIG. 35 is a closed perspective view of the base of the FIG. 5 embodiment.

Referring to FIGS. 7 and 8, an alternative example of the cupholder assembly 100 is shown, where the cupholder assembly 100 may be used together with a water bottle 200. In the preferred embodiment, to aid in the secure assembly when positioning the beverage or water bottle 200 on top of the bottom member 116, the bottom member 116 may have one or more generally circularly arranged teeth 117 extending upwards from the member surface, where the teeth largely fit into a corresponding circular aperture 220 of the same dimensions at the bottom 216 of the water bottle. The bottom 216 of the water bottle may have multiple receiving locking recesses 217 to receive the teeth of the bottom member, to hold the water bottle 200 in place, so that the water bottle may interlock to the cupholder assembly and create a safe, secure connection between the drinkware and the cupholder. In a preferred embodiment, a user may engage or disengage the water bottle 200 with a quarter turn. Referring also to FIGS. 14 and 16, a tongue-and-groove mechanism 125, wherein the tongue 125A is located on one or more teeth 117 and the groove is located in one or more recesses 217, may ensure the connection will remain stable and secure and will not disengage, even in significant turbulence in flight. Other embodiments may swap the locations of the tongue 125A and groove 125B, or use alternative methods of ensuring the connection will remain stable, such as a mechanism that snaps or clicks the water bottle 200 into place. For the purposes of this disclosure, "water bottle" may also include all standard and commonly used drinkware or beverage container.

FIGS. 9 through 17 show a third illustrative embodiment of the cupholder assembly 100. The water bottle 200 is secured solely by engaging the recesses 217 of the bottom 216 of the water bottle with the teeth 117 of the bottom member 116. In this embodiment, the bottom member 116 is comprised of one or more mounting holes 130 through which screws or other fasteners may be used to mount the bottom member 116 to a surface. The bottom member 116 has an upper surface 120, through which a channel 121 protrudes through from end to end. On either side of the channel 121, a lobe 122 exists. The lobes 122 may have one or more generally circularly arranged teeth 117 extending outward therefrom.

FIGS. 18 through 21 show a fourth embodiment of the bottom member 116 which includes an angled outer wall 140 that terminates at an upper lip 150 that is parallel to the lower surface of the bottom member 116. In this embodiment the diameter of the outer wall 140 starts widest toward the lower surface of the bottom member 116 and decreases as the outer wall 140 approaches the lip 150, such that the outer wall 140 is angled inward as it rises. The lip 150 is positioned at the same height or higher than the teeth 117. The angled outer wall 140 and lip 150 design permits an object to slide up and over the bottom member 116, which may prevent the bottom member 116 or a sliding object from sustaining damage due to their contact. It also reduces the likelihood of tripping over the bottom member 116 if it is mounted on the floor of an aircraft or other vehicle.

FIGS. 22 through 25 depict a fifth embodiment of the bottom member 116, similar to the fourth embodiment but wherein the outer wall 140 is perpendicular to both the lip 150 and the lower surface of the bottom member 116. The outer wall 140 is taller such that a water bottle 200 or other drinkware may be received by the bottom member 116 and remain substantially in place without interlocking with the teeth 117.

In their preferred form, the outer walls 140 of the fourth and fifth embodiments have only a single outward face, but other embodiments of the invention claimed in this disclosure may have multiple faces.

FIGS. 26 through 33 depict a sixth embodiment of the cupholder assembly 100 of this disclosure. In this preferred embodiment, the underside of the bottom member 116 comprises a strap 160 that may be used to mount the cupholder assembly 100 to a pole, a post, the handlebars of a bike, or any other object that may be engaged by said strap 160. For example, the strap 160 may be used to mount the cupholder assembly to a person's arm allowing them to carry the cupholder assembly 100 with them without limiting the use of a hand.

In the embodiment of the assembly of FIGS. 26 through 33, the strap 160 is a tension strap made on non-slip material to further secure in place the cupholder assembly during movement or turbulence, but other claimed embodiments may use any number of mounting devices including without limitation a ratchet strap, cinching strap, cam buckle strap, tie down, bungie cord, or pole mounting bracket.

The bottom member 116 of the cupholder assembly of FIGS. 26 through 33 may also include a channel 180 on its underside into which a pole or other mount may fit to limit slipping or other movement of the bottom member 116 with respect to the mount. A liner 190 may be inserted into said channel 180 to provide further non-slip and/or cushioning properties protecting the bottom member 116 and the mount from damage caused by contact between them. The preferred embodiment may also be comprised of openings designed to receive the strap, thereby securing excess material out of the way of the operator.

Stated variously, disclosed herein is a cupholder assembly for holding a beverage container, comprising a bottom member defining a lower surface and a generally circular container receiver opposite the lower surface; one or more teeth arranged around said receiver; and a water bottle defining a circular aperture with dimensions generally conforming to the circular shape of the receiver, wherein the aperture defines locking recesses corresponding to the one or more teeth, and an outer wall with a height taller than said one or more teeth. The water bottle may interlock to said bottom member by radially engaging the teeth with said corresponding recesses. The bottom member defines one or more openings through which at least one fastening device may be inserted to mount said bottom member to a surface.

Also disclosed herein is a cupholder assembly for holding a beverage container, comprising a bottom member defining a lower surface and a generally circular container receiver opposite the lower surface; one or more teeth arranged around said receiver; and an outer wall with a height taller than said one or more teeth. The assembly may optionally include a circular aperture with dimensions generally conforming to the circular shape of the receiver; wherein the aperture defines locking recesses corresponding to said one or more teeth; and wherein said water bottle may interlock to said bottom member by radially engaging the teeth with said corresponding recesses. Optionally the outer wall is angled inwardly, with its widest dimensions nearest the lower surface of said bottom member and its narrowest dimensions nearest the receiver. Or, optionally, the outer wall protrudes normally from the lower surface of said member and said outer wall is tall enough to retain a container without radially engaging said one or more teeth.

The assembly may further include a strap suitable to fasten or secure said bottom member to an object.

It will be appreciated that the disclosure is not restricted to the particular embodiment that has been described, and that variations may be made therein without departing from the scope of the disclosure as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A cupholder assembly for holding a beverage container, said assembly comprising:

(a) a bottom member defining a lower surface and a generally circular container receiver opposite said lower surface, wherein said receiver having an upper surface, wherein said upper surface having a channel and two lobes on each side of said channel, wherein said bottom member includes one or more mounting holes;

(b) one or more teeth circularly arranged around each one of said lobes extending upwardly from said bottom member and radially outward from said receiver, wherein each of said one or more teeth is exhibiting a tapered configuration at one end;

(c) a drinkware attachment having a bottom surface with a circular aperture having dimensions generally conforming to said circular shape of said receiver, wherein said aperture defines locking recesses corresponding to said one or more teeth, with said locking recesses being open on one end and enclosed on an opposite end, and wherein said bottom surface having one or more mounting holes attachable to said beverage container;

(d) a tongue-and-groove mechanism, wherein a tongue is located on, and extending downwardly from, each of said one or more teeth and cooperates with a respective groove, wherein said groove is located in, and extending upwardly from, each of said one or more recesses, such that each said tongue engages each said groove to form an interference fit; and (e) an outer wall with a height taller than said one or more teeth.

2. The assembly of claim 1 wherein said drinkware attachment may interlock to said bottom member by radially engaging said one or more teeth with said corresponding locking recesses.

3. The assembly of claim 2 wherein said bottom member defines one or more openings through which at least one fastening device may be inserted to mount said bottom member to a surface.

4. A cupholder assembly for holding a beverage container, said assembly comprising:

(a) a bottom member defining a lower surface and a generally circular container receiver opposite said lower surface, wherein said receiver having an upper surface, wherein said upper surface having a channel and two lobes on each side of said channel;

(b) one or more teeth circularly arranged around each one of said lobes extending upwardly from said bottom member and radially outward from said receiver, wherein each of said one or more teeth is exhibiting a tapered configuration at one end, wherein a tongue is located on, and extending downwardly from, each of said one or more teeth;

(c) an outer wall with a height taller than said one or more teeth; and (d) a drinkware attachment which defines a circular aperture with dimensions generally conforming to said circular shape of said receiver, wherein said aperture defines locking recesses corresponding to said one or more teeth, wherein said locking recesses being open on one end and enclosed on an opposite end, wherein said beverage container may interlock to said bottom member by radially engaging said teeth with said corresponding locking recesses, and wherein said attachment having a bottom surface having one or more mounting holes attachable to said beverage container.

5. A cupholder assembly for holding a beverage container, said assembly comprising:

(a) a bottom member defining a lower surface and a generally circular container receiver opposite said lower surface, wherein said receiver having an upper surface, wherein said upper surface having a channel and two lobes on each side of said channel;

(b) one or more teeth circularly arranged around each one of said lobes extending upwardly from said bottom member and radially outward from said receiver, wherein each of said one or more teeth is exhibiting a tapered configuration at one end;

(c) a drinkware attachment having a bottom surface with a circular aperture having dimensions generally conforming to said circular shape of said receiver, wherein said aperture defines locking recesses corresponding to said one or more teeth, with said locking recesses being open on one end and enclosed on an opposite end, and wherein said bottom surface having one or more mounting holes attachable to said beverage container;

(d) a snap-and-click mechanism, wherein each of said one or more teeth includes snaps and clicks into each of said locking recesses on said beverage container, such that when said beverage container is inserted into said container receiver, said snap elements engage said click elements to form an interference fit; and (e) an outer wall with a height taller than said one or more teeth.

* * * * *